United States Patent [19]

Hirth et al.

[11] Patent Number: 4,694,463
[45] Date of Patent: Sep. 15, 1987

[54] METAL VAPOR LASER TUBE

[75] Inventors: Antoine Hirth, Hegenheim, France; Klaus-Herbert Schetter, Grenzach-Wyhlen, Fed. Rep. of Germany

[73] Assignee: Institut Franco-Allemand de Recherches de Saint-Louis, St. Louis, France

[21] Appl. No.: 870,384

[22] Filed: Jun. 4, 1986

[30] Foreign Application Priority Data

Jun. 5, 1985 [FR] France .................................. 85 08457

[51] Int. Cl.$^4$ .............................................. H01S 3/03
[52] U.S. Cl. ...................................... 372/61; 372/87; 372/65; 372/34
[58] Field of Search ..................... 372/61, 65, 87, 56, 372/34

[56] References Cited

U.S. PATENT DOCUMENTS

| | | | |
|---|---|---|---|
| 4,228,406 | 10/1980 | Lewis et al. | 372/33 |
| 4,240,044 | 12/1980 | Fahlen et al. | 372/87 |
| 4,267,523 | 5/1981 | Brown | 372/34 |
| 4,442,523 | 4/1984 | Bricks | 372/56 |
| 4,611,329 | 9/1986 | Ernst et al. | 372/34 |
| 4,637,028 | 1/1987 | Kahan | 372/34 |

Primary Examiner—Leon Scott, Jr.
Attorney, Agent, or Firm—Young & Thompson

[57] ABSTRACT

According to the invention, the metal vapor laser tube comprises a cylindrical plasma tube (1), which is located inside a leak-proof container (2) and which is surrounded by a thermal insulating material, an electrode (6) at each end of the plasma tube, and a cylindrical return conductor (9) coaxial to the plasma tube (1) which is connected with one of the electrodes, and characterized in that the return conductor (9) has a radius R of about:

$$e^{\frac{107}{4\pi r^2} \frac{dE}{dV} (\frac{ro}{U})^2}$$

where:
e = exponential function,
r = radius of the plasma tube, expressed in centimeters,
dE/dV = energy density of the plasma, expressed in millijoules per cubic centimeter,
ro = specific resistance of the plasma, expressed in Ohms × centimeter,
U = electrical field, expressed in volts per centimeter.

4 Claims, 2 Drawing Figures

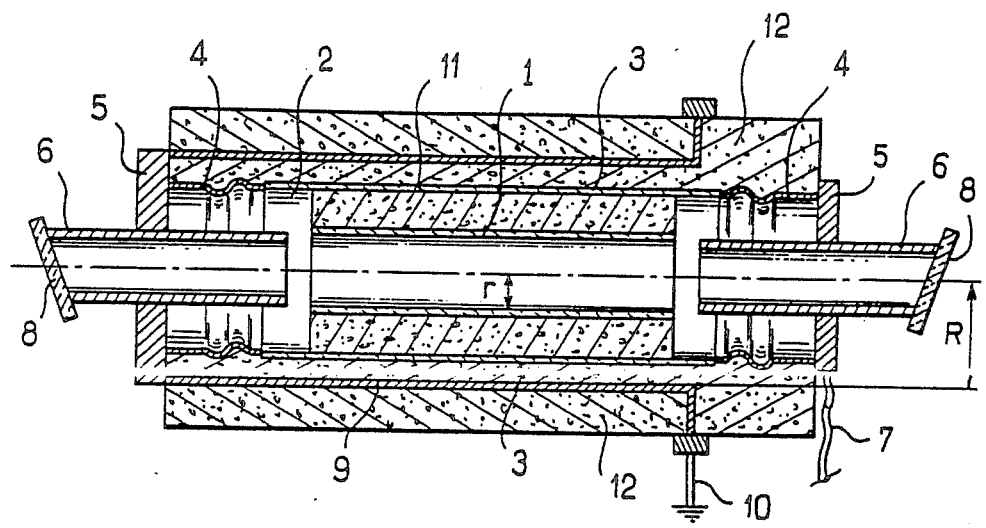
FIG_1
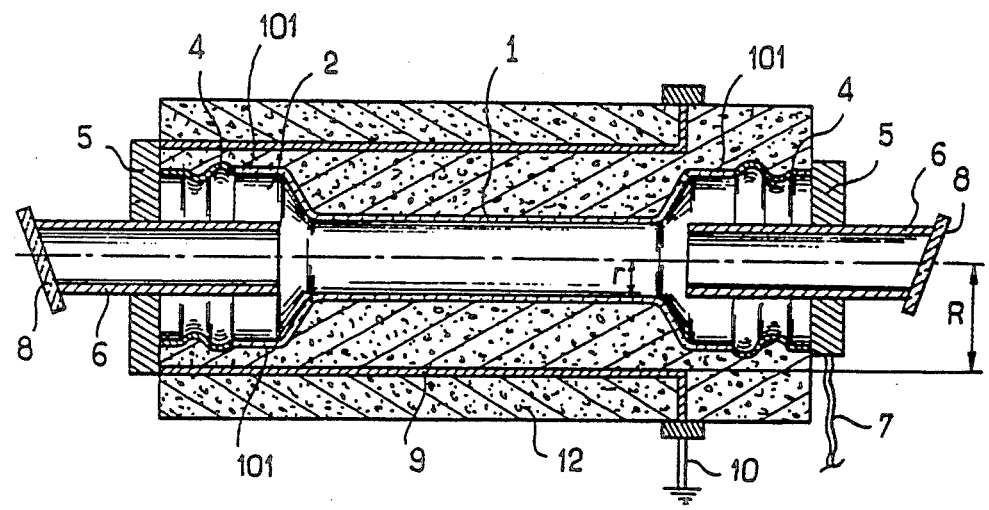
FIG_2

METAL VAPOR LASER TUBE

BACKGROUND OF THE INVENTION

1. Field of the invention

This invention is related to a metal vapor laser tube.

2. Description of the Prior Art

Laser tubes are known which generally contain a cylindrical plasma tube which is located in a leak-proof container, and an electrode at each end of the plasma tube, and a coaxial cylindrical return conductor to the plasma tube, and also a thermal insulating material between the plasma tube and the return conductor.

With these well-known laser tubes the geometry of the coaxial return conductor is rather determined by the nature and the thickness of the thermal insulating material than by the choice of the consists of the circuit, especially the additional inductance resulting from it.

SUMMARY OF THE INVENTION

The inventors have, however, observed that with laser tubes of great dimensions the part of the inductance given by the conducting plasma and the coaxial sheath which assures the return current, can take a very high value which becomes non negligible compared to the inductance of the current supply circuits or of the plasma itself, and thereby provokes pertubations of the excitation discharge of the laser tube.

Furthermore, in the existing laser tubes the whole thermal insulating material is contained in the leakproof low pressure container in which the plasma tube is positioned and an insulating material must therefore be used, that contains no substances that are apt to evaporate at a low pressure and high temperature. These materials are very expensive and thereby increase the production costs of the laser tube.

One object of this invention is to realize a laser tube with an impedance that matches as much as possible the impedance which allows an ideal discharge into the laser tube.

Another object of this invention is to propose a laser tube which can be realized less expensively than the laser tubes existing up to now.

In order to obtain these objects, a metal vapor laser tube is proposed according to the invention, which contains a plasma tube positioned in a leak-proof container and surrounded by a thermal insulating material, an electrode at each end of the plasma tube and a cylindrical return conductor coaxial to the plasma tube, which is connected with one of the electrodes, and which is characterized in that the return conductor has a radius R of about:

$$e^{\frac{107}{4\pi r^2} \frac{dE}{dV} (\frac{ro}{U})^2}$$

where :
- e = exponential function
- r = radius of the plasma tube, expressed in centimeters.
- dE/dV = energy density of the plasma, expressed in millijoules per cubic centimeter.
- ro = specific resistance of the plasma, expressed in Ohms × centimeter.
- U = electrical field, expressed in volts per centimeter.

Thus, the impedance of the laser tube is matched and the electric discharge through the laser tube takes place practically without oscillation.

According to another aspect of the invention, at least part of the thermal insulating material is located outside the leak-proof container.

Therefore, the part of the thermal insulating material which is located outside the leak-proof container, is not subjected to low pressure and can be realized with materials containing low-cost organic binders without perturbing the functioning of the laser tube.

According to a preferred embodiment of the invention, the return conductor is located in the part of the insulating material which lies outside the leak-proof container. Thus, an impedance matching can be realized while using low-cost insulating materials.

According to another preferred aspect of the invention, the plasma tube has enlarged ends whose diameter is greater than the central part's one and such enlarged ends of the plasma tube are connected in a leak-proof way with electrode supports. Thus, the leak-proof container is formed by the plasma tube itself and the whole thermal insulating material is located outside the leak-proof container, the enlarged ends of the plasma tube also preventing too much heating of the latter near the electrodes.

BRIEF DESCRIPTION OF THE DRAWINGS

Further characteristic features and advantages of the invention can be seen from the following description of non-limiting examples related to the drawings attached, in which :

- FIG. 1 is a schematic longitudinal section of a first embodiment of the laser tube according to the invention.

- FIG. 2 is a schematic longitudinal section of a second embodiment of the laser tube according to the invention.

DESCRIPTION OF THE PREFERRED EMBODIMENTS

Relating to FIG. 1, the metal vapor laser tube comprises, according to the invention, a cylindrical plasma tube 1, e.g. a tube made of refractory ceramics, which is located in a leak-proof container 2. The leak-proof container 2 is, for example, limited by a tube made of refractory ceramics 3, whose ends are connected with one end of metallic bellows 4, respectively, the other end of which is fixed in a leak-proof manner to electrode supports 5 which support electrodes 6. The electrode supports 5 comprise, in a classical way, cooling devices which are not represented, e.g. a water cooling circuit. One of the electrode supports is connected via a cable 7 with a power supply unit (not represented) which creates electrical pulses that are to excite the laser medium in the leak-proof container 2. The electrodes 6 are in a classical way tubular electrodes whose outer end is closed by windows 8 which allow the transmission of the laser beam.

A cylindrical return conductor 9 is arranged coaxially to the plasma tube 1 and one of its ends is connected via the electrode support 5 with one of the electrodes 6, whereas the other end is connected to the ground via a cable 10.

In order to assure an impedance matching which is favourable to obtain a discharge without oscillation of the current supply pulse, the Radius R of the return conductor 9 is preferably:

$$e^{\frac{107}{4\pi r^2}} \frac{dE}{dV}\left(\frac{ro}{U}\right)^2$$

where
 e = exponential function,
 r = radius of the plasma tube, expressed in centimeters,
 dE/dV = energy density of the plasma, expressed in millijoules per cubic centimeter.
 ro = specific resistance of the plasma, expressed in Ohms × centimeter.
 U = electrical field, expressed in V/cm.

According to another aspect of the invention, the plasma tube 1 is surrounded by a thermal insulating material, whose one part 11 is located inside the leak-proof container 2, between the plasma tube 1 and the tube 3 which limits the leak-proof container, whereas a second part 12 of the thermal insulating material is located outside the leak-proof container 2. The part of the thermal insulating material 11 located inside the leak-proof container 2 is for example made of coiled fibers of aluminium oxide to guarantee that no impurities evaporate inside the leak-proof container 2. On the contrary, part 12 of the thermal insulating material is made of a material which may contain organic binders that do not evaporate at atmospheric pressure. According to the embodiment shown in FIG. 1, the return conductor 9 is located in that part of the insulating material 12 which is outside the leak-proof container. Thus, the return conductor is separated from the electrode 8, with which it is not directly connected, through a medium at atmospheric pressure, and the risk of formation of an electric arc between the return conductor and the electrodes for current supply is thereby as far as possible minimized.

In the embodiment shown in FIG. 2, the reference numbers are the same as in FIG. 1 as far as comparable elements are used. In this embodiment, the plasma tube 1 has enlarged ends 101 whose diameter is greater than that of the central part and these enlarged ends 101 are directly connected in a leak-proof way with the electrode supports 5 via the metallic bellows 4. It can thus be obtained a laser tube of simplified construction, whose plasma tube equally constitutes the wall of the leak-proof container. It must be noted that the enlarged part 101 of the plasma tube prevents overheating this latter near the electrodes and, therefore, prevents the connection between the tube 1 and the metallic bellows from being subjected to too high strains. Its design also allows to locate the whole thermal insulating material outside the leak-proof container. This results in a particularly high purity of the vapors contained in the leak-proof container 2.

Naturally, the invention is not limited to the embodiments described above and various modifications may be made within the scope of the inventive concept.

In particular, a heating device which is integrated inside the insulating material, can be provided in order to guarantee a pre-heating of the walls of the plasma tube and the vaporization of the metal.

Although the thermal insulating material 12 located outside the container has been described as a rigid mass, an outer envelope can be used in which a flexible structure insulating material is placed.

What is claimed is:

1. A metal vapor laser tube comprising a cylindrical plasma tube (1), which is located in a leak-proof container (2), said plasma tube being surrounded by a thermal insulating material, electrodes (6) disposed at each end of the plasma tube supplying a current pulse to a plasma located within said plasma tube and a cylindrical return conductor (9) which is located coaxial to the plasma tube (1) and which is connected with one of the electrodes, characterized in that the conductor (9) has a radius R of about:

$$e^{\frac{107}{4\pi r^2}} \frac{dE}{dV}\left(\frac{ro}{U}\right)^2$$

where:
 e = exponential function,
 r = radius of the plasma tube, expressed in centimeters,
 dE/dV = energy density of the plasma, expressed in millijoules per cubic centimeter,
 ro = specific resistance of the plasma, expressed in Ohms × centimeter,
 U = electrical field, expressed in volts per centimeter; thereby producing impedance matching of said laser tube so as to obtain an electric discharge without oscillation of said current supply pulse.

2. A metal vapor laser tube according to claim 1, characterized in that at least a part of the thermal insulating material (12) is arranged outside the leak-proof container (2).

3. A metal vapor laser tube according to claim 2, characterized in that the return conductor (9) is arranged in that part of the insulating material (12) which is located outside the leak-proof container (2).

4. A metal vapor laser tube according to claim 3, characterized in that the plasma tube comprises enlarged ends (101) whose diameter is greater than that of its medium part, and in that the enlarged ends (101) of the plasma tube are connected in a leak-proof manner with electrode supports (5).

* * * * *